Sept. 17, 1957 W. H. BAKER 2,806,498

MUSHROOM TRIMMING MACHINES

Filed March 30, 1954 5 Sheets-Sheet 1

INVENTOR.

WILLIAM H. BAKER

BY

Z. T. Wobensmith 2nd

ATTORNEY.

INVENTOR.
WILLIAM H. BAKER
BY [signature]
ATTORNEY.

Sept. 17, 1957 W. H. BAKER 2,806,498

MUSHROOM TRIMMING MACHINES

Filed March 30, 1954 5 Sheets-Sheet 3

*INVENTOR.*
WILLIAM H. BAKER

*BY* Z. T. Wobensmith 2nd

ATTORNEY.

Sept. 17, 1957 W. H. BAKER 2,806,498

MUSHROOM TRIMMING MACHINES

Filed March 30, 1954 5 Sheets-Sheet 4

INVENTOR.
WILLIAM H. BAKER

BY

ATTORNEY.

MUSHROOM TRIMMING MACHINES

Filed March 30, 1954

INVENTOR.
WILLIAM H. BAKER
BY
[signature]
ATTORNEY.

2,806,498
Patented Sept. 17, 1957

2,806,498

MUSHROOM TRIMMING MACHINES

William H. Baker, Chatham, N. J., assignor to William Howard Green, Merion, Pa.

Application March 30, 1954, Serial No. 419,732
7 Claims. (Cl. 146—81)

This invention relates to mushroom trimming machines and more particularly to a machine for severing the caps and roots from the stems of mushrooms.

Various machines have heretofore been proposed for the removal of the caps and severing of the roots from the stems of mushrooms but none of these has proven wholly satisfactory. The holding means for the stems heretofore available has had a tendency to inadequately grip the stem or if the stem was held tightly enough it could be injured upon upward movement for root trimming.

No entirely suitable provisions have been made for moving the stem prior to severing the root portion which could function without tending to damage the stem. The prior machines had a limited capacity as well as other objectionable features.

It is the principal object of the present invention to provide an improved mushroom trimming machine which is free from the objectionable features heretofore encountered.

It is a further object of the present invention to provide an improved mushroom trimming machine which is capable of simultaneous use by two operators whereby the capacity is greatly increased.

It is a further object of the present invention to provide a mushroom trimming machine having improved structure for gripping and holding the stem of a mushroom for trimming.

It is a further object of the present invention to provide a mushroom trimming machine having improved stem holding structure which permits the elevation of the stem for a root trimming operation.

It is a further object of the present invention to provide a mushroom trimming machine having improved mechanism for elevating the stem for root trimming.

It is a further object of the present invention to provide a mushroom trimming machine which is relatively simple in construction and free from likelihood of difficulties in use.

Other objects and advantageous features of the invention will be apparent from the specification and claims.

The nature and characteristic features of the invention will be more readily understood from the following description, taken in connection with the accompanying drawings forming part thereof, in which.

Figure 1:
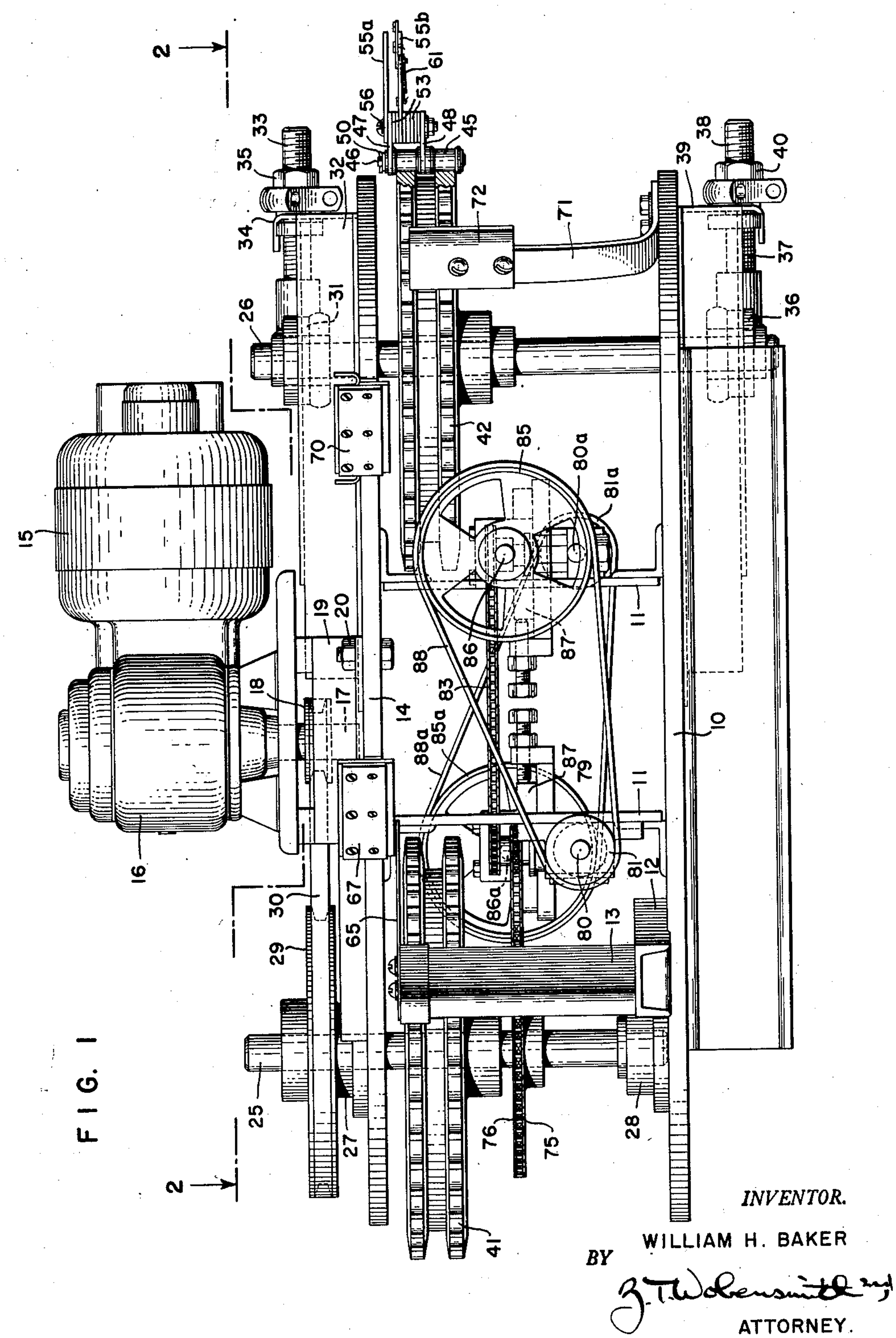
Figure 1 is a side elevational view of a mushroom trimming machine in accordance with the invention, parts being omitted to show the details of construction.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the machine preferably is provided with a suitable support or frame and this may comprise a base plate 10 on which interior vertical struts or walls 11 are provided for supporting an upper frame plate 14. The base plate 10 also has side struts 12 secured thereto and vertical posts 13 extend upwardly from the outer ends of the struts 12.

A driving motor 15, mounted on the frame plate 14, is connected to a speed reducer 16 which has a vertical shaft 17 with a pulley 18 thereon. The motor 15 and speed reducer 16 are preferably mounted on a movable carriage 19 which is held in adjusted position by nuts 20.

A pair of spaced vertical shafts 25 and 26 are provided, the shaft 25 being journaled in suitable bearings 27 and 28 carried respectively on the frame plates 10 and 14. The shaft 25 has a pulley 29 keyed thereto which is connected by a belt, such as a V belt 30, to the pulley 18.

The shaft 26 is journaled in a bearing 31 mounted on an upper take-up carriage 32 which is positioned by a threaded stud 33 extending through an abutment 34 carried by the upper plate 14, with which an adjusting nut 35 is in engagement. The shaft 26 is also journaled in a bearing 36 mounted on a lower take-up carriage 37 carried by the frame plate 10 which is positioned by a threaded stud 38 extending through an abutment 39 carried by the plate 10, with which an adjusting nut 40 is in engagement.

The shafts 25 and 26 have toothed sprockets 41 and 42, mounted thereon at the same elevation, the sprocket 41 being driven by the shaft 25. Mounted on the sprockets 41 and 42, a roller chain 45 is provided, the sprockets 41 and 42 being spaced so that the chain 45, as seen from the top, has two spaced semicircular end runs with two straight side runs therebetween.

The roller chain 45 preferably is of the type known as double strand chain of the cotter pin type, but has upper and lower mounting plates 47 and 48 on each link in place of two of the four usual cover plates 49 and cotter pins 50.

Alternate links of the chain 45 are provided with mushroom holding plates and with gripper arm holding plates. On one of the alternate sets of links of the chain 45, three similar plates **51*a*, 51*b* and 51*c* are mounted on screws 52 which extend through the mounting plates 47 and 48 and are spaced by washers 53. The plates 51*a*, 51*b*, and 51*c* are provided with V notches 54 extending inwardly from their outer marginal edges. The upper face of the plate 51*a* is adapted to support the cap of a mushroom with the stem extending downwardly in the notches 54. On the other alternate sets of links of the chain 45, two spaced plates 55*a* and 55*b* are mounted on screws 56 which extend through the mounting plates 47 and 48 and are spaced by washers 53. The plates 51*a* and 55*a* are preferably at the same level and the plates 51*c* and 55*b*** are preferably at the same level.

Each of the plates **55*b* has a V notch 57 extending inwardly from its outer marginal edge and has pivotally mounted thereon, on a pivot pin 58, a holding finger 60. A spring 61 connected to the holding finger 60 and to the plate 55*b*** normally resiliently urges the holding finger 60 inwardly. A lost motion connection is provided between the holding finger 60 and the next succeeding plate 51c and preferably includes an actuating wire or rod 62 hooked into that plate 51c and engageable, in certain positions, and specifically when the particular links of the chain 45 are on the semicircular end runs, to engage with an eye 63 on the holding arm 60 to move the holding arm 60 outwardly, against the force of the spring 61, to releasing position and to a position for the insertion of the stem portion of a mushroom.

The arm 60 is of a length to extend between the pair of plates 51b and 51c, transversely of the notches 54, so as to resiliently engage and hold a mushroom stem within the notches 54 when the links of the chain 45 are on the straight side runs, and thus accommodating mushroom stems of different diameters without separate adjustments.

On the opposite sides of the upper plate 14 and extending inwardly from posts 13 carried by the base plate 10, angularly disposed cutter knives 65 are provided, extending in the spaces between the plates 51a and 51b and beneath the plates 55a but terminating short of the chain 45, for severing the crowns of the mushrooms as the same are impelled thereby.

The upper plate 14 has mounted thereon, close to the knives 65, brackets 66 on which vertical deflecting plates 67, are secured, preferably of rubber to avoid injury to the caps, the plates being at an angle to the direction of advancing movement of the chain 45 in the straight runs thus to direct the severed crowns outwardly.

Beyond the cutter knives 65 and in predetermined spaced relation thereto, and at the same levels, additional angularly disposed cutter knives 68 are provided for severing the root portions of the mushrooms from the stem portions, the knives 68 extending inwardly from posts 13 but terminating short of the chain 45.

The upper plate 14 has mounted thereon, close to the knives 68, brackets 69 on which vertical deflecting plates 70 are secured, preferably of rubber to avoid injury to the stems, the plates 70 being at an angle to the direction of advancing movement of the chain 45 in the straight runs to direct the severed stems outwardly.

The base plate 14 also has posts 71 secured thereto on the upper end of which are deflecting plates 72, preferably of rubber, and which extend upwardly to just below the lower faces of the plates 51c, for directing the roots outwardly, upon their release.

The shaft 25 has a sprocket 75 mounted thereon which is connected by a chain 76 to a sprocket 77 on a shaft 78. The shaft 78 is connected by bevel gears 79 to a shaft 80 on which a belt pulley 81 is mounted. A sprocket 82 is also provided on the shaft 78 and is connected by a chain 83 to a sprocket 82a on a shaft 78a. The shaft 78a is connected in a manner similar to the connection of the shaft 78 to a shaft 80a which has a belt pulley 81a mounted thereon.

Pulleys 85 and 85a on the shafts 86 and 86a are provided, the shafts 86 and 86a being mounted in adjustable take-up mountings 87.

Endless flexible belts 88 and 88a are provided on the pulleys 81 and 88 and 81a and 88a respectively, and are located so as to be directly beneath the plates 51. The pulleys 88 and 88a are larger in diameter than the pulleys 81 and 81a so that the upper run of the belt is inclined at the desired angle, and preferably at an angle of the order of 30°. The horizontal component of the velocity of the upper runs of the belts 88 and 88a is preferably the same as that of the chain 45 and the vertical spacing with respect to the chain is such as to impel the roots with their attached stems upwardly for severing of the roots, as hereinafter explained.

The mode of operation will now be pointed out.

Figure 2:
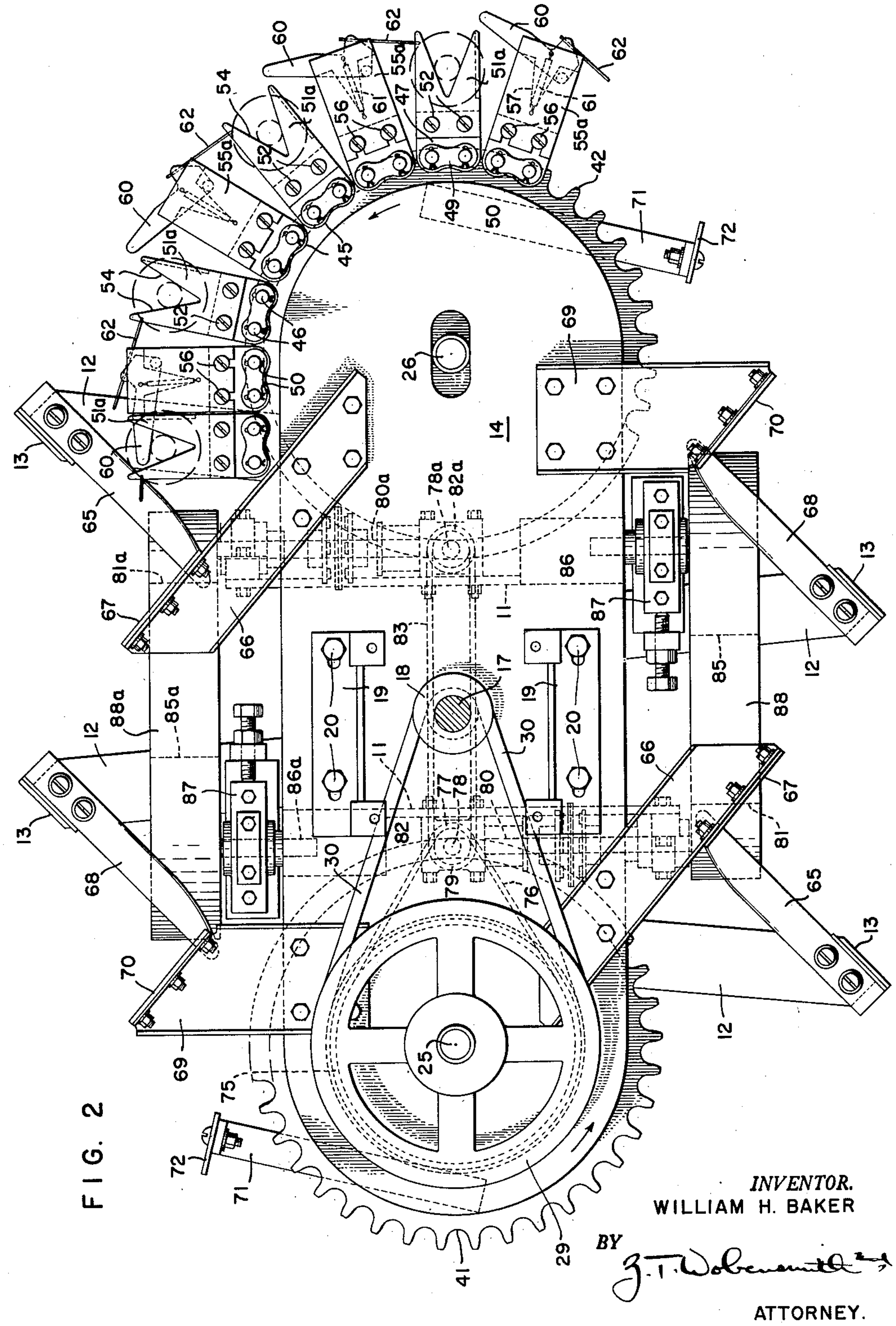
Fig. 2 is a horizontal sectional view of the machine shown in Fig. 1, taken approximately on the line 2—2 of Fig. 1, and parts being omitted to show the details of construction.
Figure 3:
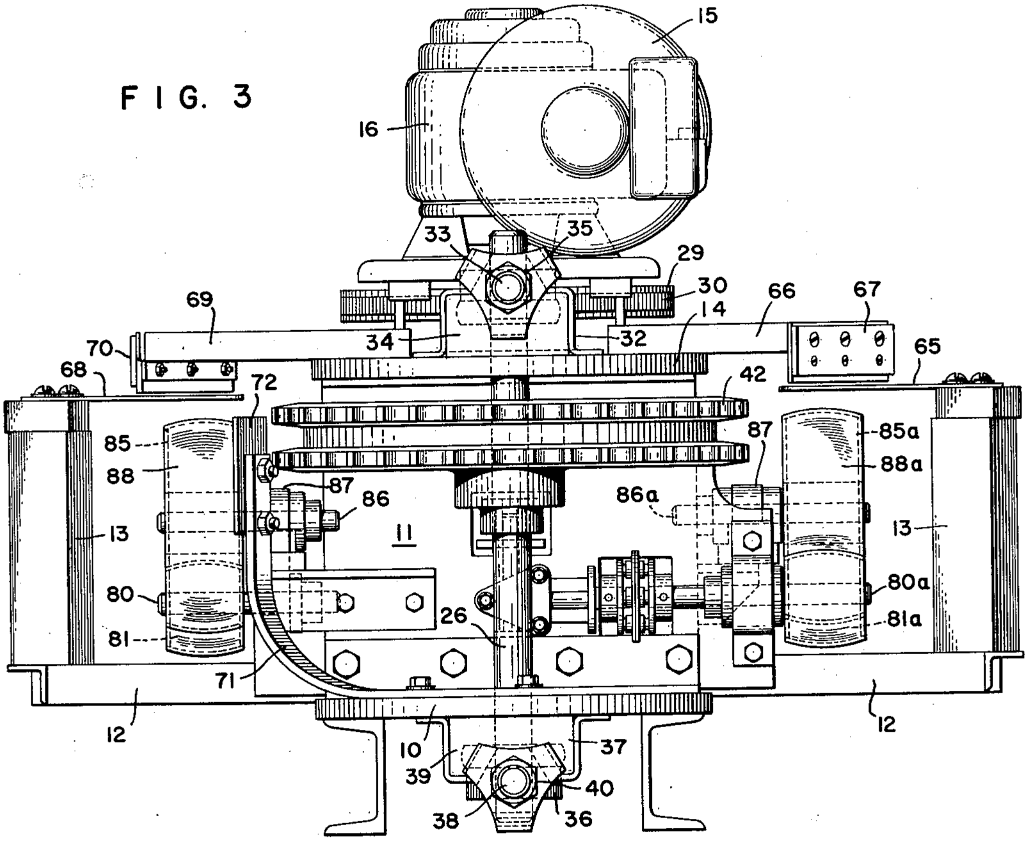
Fig. 3 is an end elevational view of the machine shown in Fig. 1.
Figure 4:
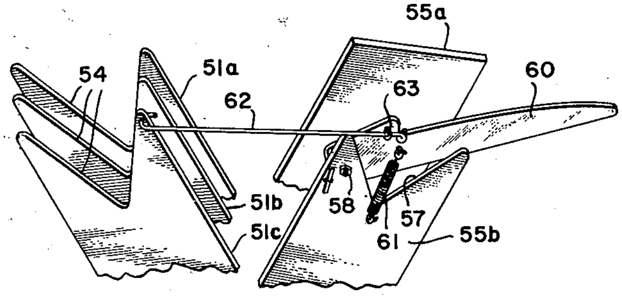
Fig. 4 is an enlarged fragmentary perspective view showing the details of the stem holding structure.
Figure 5:
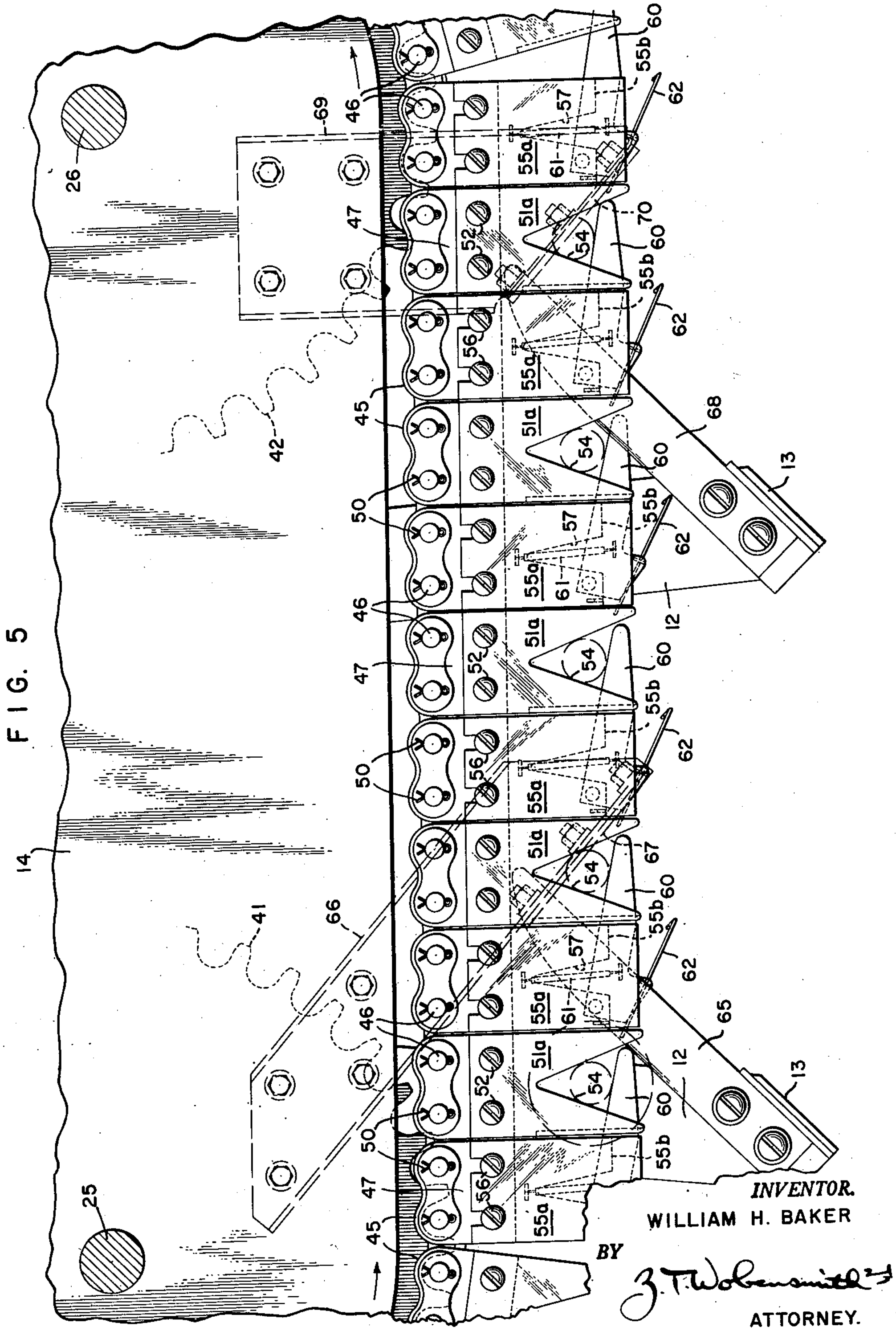
Fig. 5 is a fragmentary horizontal sectional view, enlarged, of a portion of machine showing one of the side runs for cutting.
Figure 6:
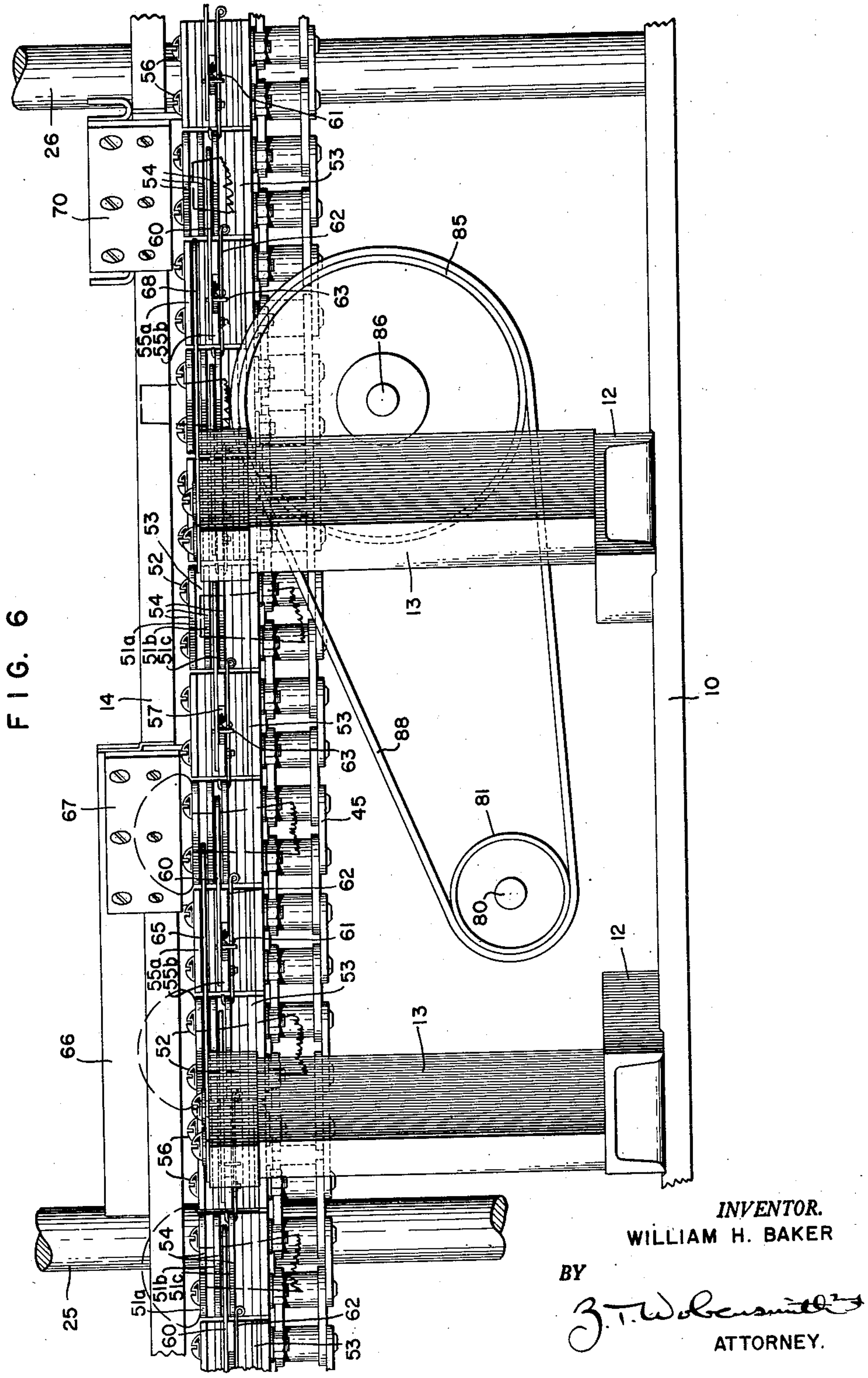
Fig. 6 is a fragmentary side elevational view, enlarged, of the portion of the machine shown in Fig. 5.

Upon rotation of the motor 15, through the speed reducer 16, the shaft 17, pulley 18 and the belt 30, the pulley 29 on the shaft 25 is driven to continuously drive the sprocket 41 and the chain 45 thereon at a predetermined speed. The sprocket 41 is shown, as seen from above, as driven in a counterclockwise direction. At the same time the belts 88 and 88a are driven in the same directions as the contiguous portions of the chain 45 as previously pointed out. When the chain 45 is at the semicircular end portions of its runs, the respective groups of plates 51a, 51b and 51c and the plates 55a and 55b are separated at their outer extremities and the arms 60 are moved outwardly and away from the notches 54 as particularly shown in Figs. 2, 4 and 5. The operators are preferably located near the terminal end portions of each of the semicircular runs of the chain 45, and while the chain 45 is moving past, manually place the mushrooms within the grooves 54, supported by the upper face of the plates 51a and with the stems extending downwardly within the V notches 54. As the advancing portions of the chain 45 respectively pass from the semicircular runs to the straight runs, the plates 55a and 55b are moved into positions alongside of the plates 51a, 51b and 51c and the holding arms 60 are each respectively and consecutively swung by the movement of the plates 55b to a position to resiliently engage the stem portions of the mushrooms at a location between the plates 51b and 51c. The springs 61 permit of accommodating mushroom stems of different diameters. As the chain 45 advances the mushrooms thus gripped and held, with their stem portions in the notches 54 and the arms 60 in engagement therewith, are advanced to and past the knives 65 where the caps are severed with a minimum of stem length on the caps corresponding to the thickness of the plates 51a. The severed mushroom caps supported on the upper faces of the plates 51a move outwardly along the plates 67 for collection. As the chain 45 continues to advance in its travel the root portions of the stems engage with the belts 88 and 88a and are moved upwardly with respect to the notches 54 and the arms 60 by these belts and advanced to the cutter blades 68 which sever the root portions from the stems so that the stems, supported on the upper faces of the plates 51a, can be moved outwardly by the plates 70 for collection. Upon further advance of the chain 45 and the entry upon the beginning portion of the semicircular end runs, the separation of the plates 51a, 51b and 51c from the plates 55a and 55b is effected and the actuator rods 62 are impelled to engage the rings 63 to move the arms 60, against the force of the springs 61, to a releasing position so that root portions are no longer held but are free to fall and if required be deflected outwardly by the plates 72 for collection. As the chain 45 advances the respective operations are continually effected at the various locations previously indicated of manual insertion of the mushrooms followed by clamping of the stems, severing of the caps, raising of the stem and root portions, severing of the stem portions, removal of the stems for collection, releasing of the root portions for collection, and placing the arms 60 and the plates 51a, b and c in condition for the insertion of mushrooms to be trimmed.

I claim:

1. In a machine for trimming mushrooms, a support, spaced sprockets carried by said support, a chain in engagement with said sprockets and having spaced curved runs and connecting side runs, spaced mushroom holding members carrier by said chain, supporting members carried by said chain, members carried by said supporting members for engaging stem portions of the mushrooms for holding said mushrooms on said holding members and movable to engaging and non-engaging positions, members carried by said supporting members for moving said engaging members to one of said positions, members carried by the holding members for moving said engaging members to the other of said positions on the curved runs of said chain, and cutter members disposed on said side runs for severing portions of the mushrooms.

2. In a machine for trimming mushrooms, a support, spaced horizontally disposed sprockets carried by said support, a horizontal disposed chain in engagement with said sprockets and having spaced semicircular end runs and straight connecting side runs, spaced mushroom supporting members carried by said chain, additional supporting members carried by said chain, members carried by said additional supporting members for engaging stem portions of the mushrooms for holding said mushrooms on said mushroom supporting members and movable to engaging and non-engaging positions, members carried by said additional supporting members for moving said engaging members to one of said positions, members carried by said mushroom supporting members for moving said engaging members to the other of said positions on the end runs of said chain, and cutter members disposed on said straight runs for severing portions of the mushrooms.

3. A machine as defined in claim 2 in which the mushroom supporting members comprise plates with inwardly extending notches for the reception of the mushroom stems.

4. A machine as defined in claim 2 in which the mushroom supporting members comprise plates with inwardly extending notches for the reception of the mushroom stems, the supporting members comprise additional plates carried by the chain in alternating relation to said first mentioned plates, and the stem engaging members comprise arms intersecting the notches and said arms are mounted on said additional plates.

5. In a machine for trimming mushrooms, a support, spaced horizontally disposed sprockets carried by said support, a horizontally disposed chain in engagement with said sprockets and having spaced semicircular end runs and straight side runs, spaced mushroom supporting members carried by said chain and having inwardly extending notches for the reception of the mushroom stems, additional supporting members on said chain in alternate relation to said first supporting members, members carried by said additional supporting members for engaging stem portions of the mushrooms for holding said mushrooms in said notches and movable to engaging and non-engaging positions, resilient members carried by said additional supporting members for moving said engaging members to one of said positions, members carried by said mushroom supporting members for moving said engaging members to the other of said positions on the end runs of said chain, and cutter members disposed on said straight runs for severing portions of the mushrooms.

6. A machine as defined in claim 5 having members for changing the positions of the mushroom stems, and additional cutter members disposed on said straight runs for severing root portions of the mushroom stems.

7. In a machine for trimming mushrooms, a support, spaced horizontally disposed sprockets carried by said support, a chain in engagement with said sprockets and having spaced semicircular end runs and straight side runs, spaced mushroom supporting members carried by said chain, additional supporting members carried by said chain, members carried by said additional supporting members for engaging stem portions of the mushrooms for holding said mushrooms on said mushroom supporting members and movable to engaging and non-engaging positions, said chain having two supply stations one on each of said end runs, resilient members carried by said additional supporting members for moving said engaging members to stem engaging position, members carried by said mushroom supporting members for moving said engaging members to non-step engaging position on the end runs of said chain, cutter members disposed on said straight runs for severing cap portions of the mushrooms, members for elevating the mushroom stems, and additional cutter members disposed on said straight runs for severing root portions of the elevated mushroom stems.

References Cited in the file of this patent

UNITED STATES PATENTS

| | | |
|---|---|---|
| 2,310,358 | Emmons et al. | Feb. 9, 1943 |
| 2,341,052 | Lurmann et al. | Feb. 8, 1944 |
| 2,494,914 | Urschel et al. | Jan. 17, 1950 |
| 2,503,975 | Sutton | Apr. 11, 1950 |
| 2,617,461 | Bach | Nov. 11, 1952 |
| 2,621,692 | Urschel et al. | Dec. 16, 1952 |
| 2,638,949 | Blevins et al. | May 19, 1953 |